UNITED STATES PATENT OFFICE.

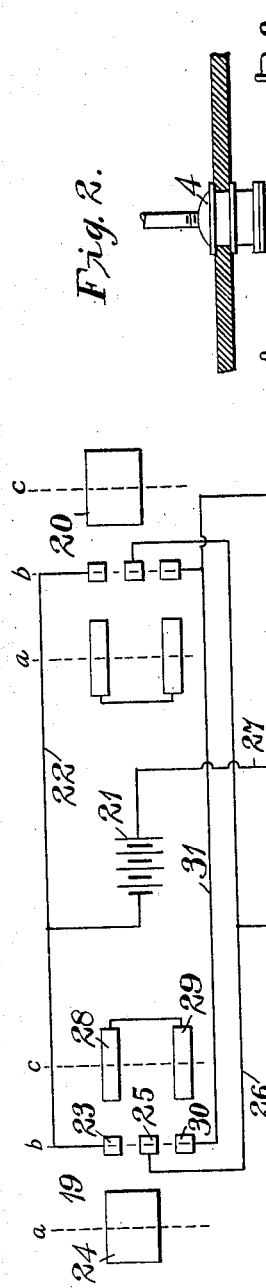

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

VEHICLE CONTROL SYSTEM.

No. 870,802.      Specification of Letters Patent.      Patented Nov. 12, 1907.

Application filed January 3, 1906. Serial No. 294,430.

*To all whom it may concern:*

Be it known that I, NORMAN W. STORER, a citizen of the United States, and a resident of Pittsburg, in the county of Allegheny and State of Pennsylvania, have invented a new and useful Improvement in Vehicle Control Systems, of which the following is a specification.

My invention relates to vehicles and has special reference to the starting of such vehicles as are adapted for railway service and are propelled by motors which are located on the vehicle trucks.

The object of my invention is to provide means for effectively maintaining an equal distribution of weight upon the several pairs of vehicle truck wheels during the starting period.

In the design and construction of vehicles which are propelled by motors or similar driving means carried upon the vehicle itself, the entire weight of the vehicle and its equipment is, so far as possible, equally distributed upon the several pairs of driving wheels. When vehicles constructed in this manner are started under adverse or heavy conditions of service, such as are constantly imposed on motor-driven locomotives, the weight of the vehicle is unequally distributed between the forward and the rear wheels of each truck, although such weight may be equally distributed when the vehicle is at rest. This action may be explained as due to the turning moment resulting when the propelling force exerted by the truck opposes the inertia of the vehicle body and such trailing vehicles as are attached thereto which is exerted along a line substantially parallel to the propelling force and in an opposite direction thereto but in a plane which is materially above the plane of the propelling force. That this action changes the distribution of weight upon a vehicle truck is verified by the fact that slipping of its forward wheels is observed to occur before that of its rear wheels. The aforesaid change in weight distribution is obviously greatest in locomotives at the time when they are starting trains of cars which have no independent means of propulsion and the inertia of which is very great.

When vehicles which are driven by electric motors are started it has been customary in the prior art to connect the motors, which were usually of the series type and of similar design, in series circuit relation so that equal torques were exerted by the several motors and an unequal distribution of weight occurred, as already explained.

The draw-bar pull of a locomotive or the accelerating force of a similarly propelled vehicle is proportional to a multiple (depending upon the number of motors) of the maximum value of torque which may be applied to the forward wheels of any one truck without slipping, since the torques exerted by the several motors are equal, and this value is substantially less than it may become if adequate means is employed for maintaining an equal distribution of the vehicle weight during the starting period which does not affect the normal equality of weight distribution which exists when the vehicle is at rest or operating at an approximately uniform speed.

With a view to increasing to a maximum the drawbar pull which may be exerted by a locomotive of a given weight, I have provided means for automatically changing the point of application of the weight upon a given truck so that the actual weights borne by the pairs of vehicle wheels during starting may be equal and, since the possibility of slipping exists only during this period, I automatically return this point of application to its normal position in the center of the truck after the control mechanism for the vehicle equipment has passed its starting positions. This object may be effected by bringing a downward pressure to bear upon each truck at a point ahead of the king pin, or the normal point of application of the weight, which tends to move the actual point of application forward.

The desired pressure may be exerted by any convenient means, such as a pneumatic cylinder, and in order to obtain the desired results for all the vehicle trucks and for either direction of travel, it is desirable to provide two such cylinders for each truck, one at each side of the center, which may preferably be controlled by electromagnet valves.

Figure 1 of the accompanying drawing is a diagrammatic view of a system embodying my invention as applied to a double truck vehicle and Fig. 2 is an end elevation of one of the vehicle trucks.

Referring to the drawing, a pneumatic system, comprising a fluid storage tank 1, electromagnet valves 2 and 3, and pressure cylinders 4, 5, 6, and 7, is applied to a railway vehicle comprising a body 8 and a plurality of trucks 9 and 10 upon which electric driving motors 11 and 12, and 13 and 14 are respectively mounted.

The pressure cylinders 4, 5, 6 and 7 are rigidly attached to the bottom of the vehicle body 8 and are severally provided with pistons 15 and pressure rods 16 which are connected therewith to exert a downward pressure upon the trucks 9 and 10 when fluid pressure is admitted to their cylinders. The cylinders 4 and 6 and the cylinders 5 and 7 occupy corresponding positions with reference to the trucks 9 and 10 and are respectively interconnected by pipes 17 and 18 to which compressed air or similar fluid may be admitted from the storage tank 1 through magnet valves 2 and 3. respectively.

Control devices 19 and 20 may be located at the respective ends of the vehicle and may be readily combined with controllers or master switches of any well known type for governing electric vehicle equipments. The devices 19 and 20 are adapted to occupy either position $a$ or position $c$, which correspond to the starting positions of the vehicle controller for forward and reverse motor rotation, or a position $b$ which corresponds to the "off" position of the controller. When the controlling device 19 occupies position $a$ energy is supplied from a storage battery 21, or other convenient source, through conductor 22, contact finger 23, ring segment 24, contact finger 25 and conductor 26 to the magnetizing winding of the electromagnet valve 2 from which point circuit is completed through conductor 27 to the opposite terminal of the battery 21. When energy is supplied to this electromagnet the valve is opened and admits fluid pressure from the tank 1 through pipe 17 to the pressure cylinders 4 and 6 and this fluid pressure is imparted to the trucks 9 and 10 through the pressure rods 16 at a point which is ahead of the normal point of application of the weight of the vehicle body upon the trucks. If the vehicle controller is reversed the controlling device 19 is first moved to the position $b$, when the electromagnet valve 2 is closed, since its magnet winding is deënergized by reason of the disengagement of the contact fingers 23 and 25 from the ring segment 24 and the pressure in the cylinders 4 and 6 is immediately relieved. The controlling device 19 is then moved to occupy the position $c$ in which energy is supplied from battery 21 through conductor 22, contact finger 23, ring segments 28 and 29, contact finger 30 and conductor 31 to the magnetizing winding of the electromagnet valve 3 from which point the circuit is completed as before through conductor 27 to the opposite terminal of battery 21. The energizing of this winding opens the valve 3 which admits fluid pressure from the tank 1 through pipe 18 to the cylinders 5 and 7. In this way, the point of application of pressure upon the trucks 9 and 10 is moved out of its normal position in a direction which is opposite to that in which it was moved for the reverse rotation of the motors.

When the controlling device 20 occupies the position $a$, which corresponds to the position $c$ for the device 19, energy is supplied in a similar manner to the valve magnet 3 and when this device occupies the position $c$, which corresponds to the position $a$ for the device 19, energy is similarly applied to the valve 2. In this way, when the vehicle is started in either direction from either end of the vehicle a downward pressure is automatically exerted upon the forward portion of the vehicle trucks so that a substantially equal distribution of weight may be maintained during starting.

While I have shown and described only one specific means for so adjusting the pressure exerted upon the track rails by the truck wheels of an electrically propelled vehicle as to avoid slipping of the forward wheels in starting, it is my intention to cover the invention broadly, as I believe myself to be the first to provide any means for effecting this result.

I claim as my invention:

1. The combination with a vehicle frame or body, one or more supporting trucks pivotally secured to said frame or body and severally provided with a plurality of pairs of truck wheels, and one or more propelling motors mounted on the truck or trucks, of means for adjusting the point of application to the truck of the resultant force produced by the weight of the frame or body.

2. In a vehicle, the combination with one or more trucks and driving motors therefor, of means for maintaining a substantially equal distribution of weight upon the several pairs of truck wheels during starting, said means comprising means for shifting the point of application of the weight of the vehicle ahead of the center of the truck.

3. In a vehicle, the combination with a pair of carrying trucks and driving motors therefor, of means for automatically applying downward pressure upon the trucks at points ahead of the normal point of application of the weight of the vehicle body upon the trucks.

4. The combination with a vehicle, a pair of carrying trucks therefor, and driving motors for said trucks, of means for automatically exerting a downward pressure upon the trucks ahead of the supporting points, said means comprising a plurality of fluid-pressure actuated members supported by the vehicle body.

5. The combination with a vehicle, a pair of trucks therefor, and driving motors for said trucks, of means for automatically exerting a downward pressure upon the trucks ahead of the supporting points, said means comprising a plurality of fluid-pressure cylinders supported by the vehicle body, pistons therefor, rods actuated by said pistons to engage the trucks and means for admitting fluid-pressure to the forward cylinders for the respective trucks as the driving motors are started in either direction.

6. The combination with a vehicle, a pair of trucks therefor, a plurality of electric driving motors mounted on said trucks and controlling means for said driving motors, of means for automatically exerting downward pressure upon the trucks ahead of the supporting points, said means comprising a plurality of fluid-pressure actuated members supported by the vehicle body.

7. The combination with a vehicle, a pair of trucks therefor, a plurality of electric driving motors mounted on said trucks and controlling means for said driving motors, of means for automatically exerting downward pressure upon the trucks ahead of the supporting points, said means comprising a plurality of fluid-pressure cylinders supported by the vehicle body, pistons therefor and rods actuated by said pistons to engage the trucks, and means for admitting fluid pressure to the forward cylinders for the respective trucks as the driving motors are started in either direction.

8. The combination with a vehicle, a pair of trucks therefor, a plurality of electric driving motors mounted on said trucks and controlling means for said driving motors, of means for automatically exerting downward pressure upon the trucks ahead of the supporting points, said means comprising a plurality of fluid-pressure cylinders supported by the vehicle body, pistons therefor and rods actuated by said pistons to engage the trucks, and means for admitting fluid-pressure to the forward cylinders for the respective trucks as the driving motors are started in either direction, said means comprising electrically controlled selective valves the action of which is dependent upon the position occupied by the controlling means.

9. In a vehicle, the combination with a pair of trucks, and driving motors therefor, of means for applying downward pressure to each end of each truck, and means for governing the application of such pressure in accordance with the direction of movement of the vehicle.

10. In a vehicle, the combination with a pair of trucks, and driving motors therefor, of means for applying downward pressure to each truck either forward or back of its center, and a governing device for directing the application of such pressure to the forward portions of the trucks for either direction of movement.

11. The combination with a vehicle frame or body, one or more four-wheeled supporting trucks pivotally secured thereto, and one or more propelling motors mounted on the truck or trucks, of means for shifting forward the point of application to the truck of the resultant force produced by the weight of the frame or body.

12. The combination with a vehicle frame or body, one or more four-wheeled supporting trucks pivotally secured thereto, and one or more electric propelling motors mounted on the truck or trucks, of electrically controlled means dependent upon the direction of the motor rotation for automatically shifting forward the point of application to the truck of the resultant force produced by the weight of the frame or body while starting the vehicle.

13. The combination with a frame or body, and one or more four-wheeled trucks pivotally secured thereto, of a plurality of propelling motors mounted upon the truck or trucks, and means for adjusting the relation between the force exerted by the weight of the frame or body upon the truck or trucks and the tractive efforts exerted by the motors when starting the vehicle.

14. The combination with a vehicle frame or body, and one or more self-adjusting trucks therefor, of one or more propelling motors supported by each truck, and electrically controlled means for equalizing the tractive efforts of the pairs of truck wheels while starting the vehicle.

15. The combination with a vehicle frame or body, and one or more self-adjusting trucks therefor, of one or more propelling motors supported by the truck or by each of a plurality of trucks, and electrically controlled means for equalizing the tractive efforts of the pairs of truck wheels while starting the vehicle.

In testimony whereof, I have hereunto subscribed my name this 30th day of December, 1905.

NORMAN W. STORER.

Witnesses:
R. J. DEARBORN,
BIRNEY HINES.